Nov. 17, 1953 J. S. GLOMB 2,659,290
CULTIVATOR
Filed Nov. 1, 1949
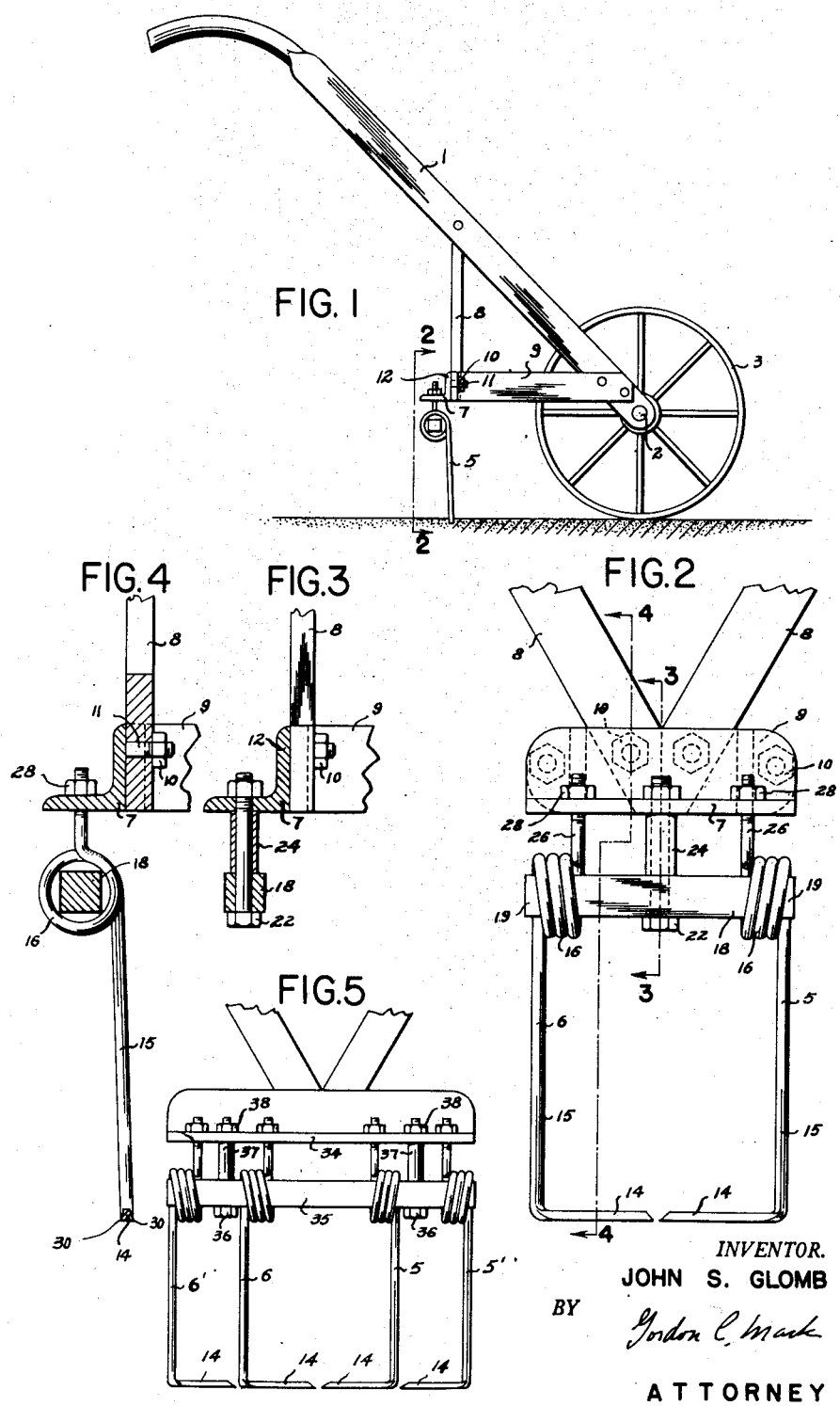
INVENTOR.
JOHN S. GLOMB
BY Gordon C. Mack
ATTORNEY Patented Nov. 17, 1953

2,659,290

UNITED STATES PATENT OFFICE 2,659,290

CULTIVATOR

John S. Glomb, Barberton, Ohio, assignor of one-half to T. C. Dethloff, Akron, Ohio Application November 1, 1949, Serial No. 124,758

1 Claim. (Cl. 97—59)

This invention relates to a cultivator. The cultivator is preferably of the hand-operated type but may be designed to be operated by power-driven equipment.

This application is a continuation-in-part of my application Serial No. 653,532 filed March 11, 1946, now abandoned.

Most cultivators form furrows in the ground as they pass over it. These furrows induce soil erosion. The cultivator of this invention does not produce furrows and is not designed to enter the ground any more than a fraction of an inch—just deep enough to break up the top surface to form a mulch which holds the moisture. The blades of the cultivator lie in a substantially horizontal plane. Each is supported by a substantially vertical rod-like support or shank, although the whole or at least the bottom of the shank is preferably tilted backward a few degrees from the blade. There is a coil spring formed preferably in the upper portion of this shank, the coils of which lie in a plane parallel to the direction of movement of the cultivator.

The preferred cultivating element to be used in a hand cultivator is made by bending a coil into a rod of spring steel about one-eighth to one-quarter or three-quarters of an inch in diameter, and then bending the bottom of the rod at a right angle to form a blade one to three inches long which lies parallel with the axis of the coil. In power driven equipment, the blade may be up to an inch thick or thicker. The front or leading edge of each blade is sharpened, and preferably both the front and rear edges are sharpened so that the cultivator can be worked backward and forward in the soil without having to remove the blades from the soil. Generally two or more such cultivating elements are used in a cultivator and it is preferable to arrange the outer elements with their blades pointing inwardly from the shanks. The shanks then protect plants from being injured by the blades which, if they projected outwardly, might injure the plants or cut them down.

The coil permits the blade to give backwardly and also sideways when it encounters matter which is not easily dislodged. The blade may ride up over or around this matter. Generally, however, the matter is dislodged or broken up. The backward flexing of the support, made possible by the spring coil, increases the pressure on the blade to dislodge or break up the obstacle.

The shank which rises from the blade is preferably not inclined forwardly of the blade. It may be vertical, but is preferably inclined a few degrees backward. When the cultivator is moved through hard packed soil, the blades do not move smoothly but repeatedly catch momentarily and then give, moving forward with a chattering or vibrating action. In using the hand-operated cultivator of preferred design, the cultivator is ordinarily pushed forward and then pulled backward, with the blades at all times, just under the soil. The return movement need not be over the exact path covered in the forward movement, but may be adjacent to it.

The invention will be further described with reference to the drawings, in which—

Fig. 1 is a side elevation of a hand cultivator;

Fig. 2 is a view along the line 2—2 of Fig. 1;

Fig. 3 is a cross-sectional view on line 3—3 of Fig. 2;

Fig. 4 is a cross-sectional view on line 4—4 of Fig. 2; and

Fig. 5 is a view showing a modified blade arrangement.

The cultivator shown in Fig. 1 is formed with handle 1 supported on the axle 2 of a single wheel 3. The cultivating elements 5 and 6 are supported below the angle iron bar 7. This bar is horizontally fastened to the braces 8 and 9 by the nuts 10 which are threaded onto the studs 11 which are welded to the back of the upright leg 12 of the angle bar.

The cultivating elements 5 and 6 are preferably formed from straight, spring steel rods. The blade 14 of each element is bent at right angles to its shank 15. A coil 16, the axis of which is parallel to the blade 14 is formed in each element at about six inches above the blade.

These elements are mounted below the bar 7 with the blades turned inwardly and in line with one another, with the ends of the blades nearly touching each other. They are supported by a cross bar 18, the ends 19 of which extend through the coils 16. This bar 18 is rigidly fastened to angle bar 7 by the bolt 22 which extends through a spacer 24 located between the two bars. The upper end 26 of each element is threaded and fits through a hole in the cross bar and these ends are anchored by the nuts 28. It is not necessary that the upper ends of the shanks be threaded and held by nuts. Alternatively, the elements may be supported by the cross bar 18 and held in the upright position by the upper end of each being passed through a hole in the bar 7.

As the cultivator is moved through the soil the shanks vibrate due to the coils, and the cross bar 18 effectively dampens this vibration. The elements may be mounted without such a cross bar but unless some means is provided to prevent the shanks flexing above the coils, such flexing will cause them to crystallize quickly and then break.

The cultivating elements 5 and 6 are mounted with the shanks 15 forward of the cross bar 18 so that as they are bent backward the stiff coils tighten and the power required to continue bending them increases. To accomplish this the elements 5 and 6 are formed as glove-like opposites with the coil of element 5 wound oppositely to the coil of element 6.

The cross-sectional shape of blade 14 is shown in Fig. 4. The edges 30 are sharpened, and this blade is tempered to give it strength.

In the modification shown in Fig. 5 there are four cultivating elements fastened to angle bar 34 which is somewhat longer than the bar 7 of Fig. 2. The elements are supported on a cross bar 35 which passes through the coil of each of the elements and is fastened rigidly below the angle bar by the two bolts 36, with a spacer 37 around each bolt. This arrangement of the elements permits the cultivator to operate in a wider swath than the embodiment shown in Fig. 2. The two extra units 5' and 6' at the ends of the bar 34 in Fig. 5 are arranged with their blades turned inwardly so that the cultivator may pass quite close to a plant or the like without danger of cutting it off or injuring its roots.

The cultivator produces a smooth-surfaced, friable soil and destroys the weeds by leaving them on top of the soil. In working a terrain which contains stones or hard spots or other irregularities, the flexible shank and coil permit the blade to be deflected when it contacts an obstruction, so that the blade may swing to one side or the other, or ride upward until the obstruction is cleared.

Although the cultivator shown in the drawings is adapted for hand operation, it is readily seen that it may be designed to be drawn by a tractor or other suitable mechanical device. The cultivator may comprise a single blade, or any indefinitely large number of blades may be used. They may be aligned with one another or staggered. Two blades which point inwardly and are supported at their outer ends constitute a preferred implement. Suspension of each blade in a horizontal plane by a coiled support with a shank rising substantially perpendicularly from the blade, and the coil lying in a plane parallel to the general direction of movement of the cultivator are important features of the invention. Variations from the design shown may be made without departing from the scope of the appended claim.

What I claim is:

A wheeled cultivator, which includes a supporting bar arranged across the cultivator, a cross bar below the supporting bar, parallel to it and fastened thereto, and a plurality of cultivating elements each made of a single rod-like steel element and having a substantially vertical shank with its upper end fastened into the supporting bar, a coil spring in each shank and located tight around the cross bar, with the bottom of each steel element bent at a right angle with at least one edge sharpened to a blade, with the bent bottom of each steel element lying across the cultivator and the bent portions of the two outer elements pointing inwardly, there being no connection between the elements below the cross bar.

JOHN S. GLOMB.

References Cited in the file of this patent

UNITED STATES PATENTS

| Number | Name | Date |
| --- | --- | --- |
| 377,998 | Estep | Feb. 14, 1888 |
| 692,649 | Fischer | Feb. 4, 1902 |
| 806,707 | Pellegrin | Dec. 5, 1905 |
| 948,614 | McCall | Feb. 8, 1910 |
| 1,102,097 | Smith | June 30, 1914 |
| 1,185,581 | Beymer | May 30, 1916 |
| 1,545,917 | Meherhoff | July 14, 1925 |

FOREIGN PATENTS

| Number | Country | Date |
| --- | --- | --- |
| 106,144 | Switzerland | Aug. 1, 1924 |